United States Patent [19]

Claassen

[11] Patent Number: 5,484,256
[45] Date of Patent: Jan. 16, 1996

[54] CLAMPING DEVICE, ESPECIALLY FOR CLAMPING A STACK DURING STACK CHANGES IN A STACKING APPARATUS

[75] Inventor: Ernst Claassen, Goch, Germany

[73] Assignee: Jagenberg Papiertechnik GmbH, Neuss, Germany

[21] Appl. No.: 377,526

[22] Filed: Jan. 20, 1995

[30] Foreign Application Priority Data

Jan. 22, 1994 [DE] Germany ............... 44 01 818.5

[51] Int. Cl.⁶ .................................... B65G 57/02
[52] U.S. Cl. .................... 414/790.8; 294/103.1
[58] Field of Search ............. 294/103.1, 111, 294/119.1; 414/790.8, 796, 796.9

[56] References Cited

U.S. PATENT DOCUMENTS

| | | | |
|---|---|---|---|
| 4,753,473 | 6/1988 | Arnett | 294/104 |
| 4,949,953 | 8/1990 | Claasen et al. | 414/790.8 |

FOREIGN PATENT DOCUMENTS

| | | |
|---|---|---|
| 0316568 | 5/1989 | European Pat. Off. |
| 581188 | 2/1994 | European Pat. Off. |
| 1435976 | 3/1966 | France ............... 294/103.1 |
| 2441459 | 3/1976 | Germany |
| 3304673 | 8/1984 | Germany |
| 3421915 | 12/1984 | Germany |
| 3616470 | 6/1987 | Germany |
| 3739194 | 6/1989 | Germany |
| 3801397 | 8/1989 | Germany |
| 3911969 | 10/1990 | Germany |
| 9110004.6 | 11/1991 | Germany |

*Primary Examiner*—Michael S. Huppert
*Assistant Examiner*—Janice L. Krizek
*Attorney, Agent, or Firm*—Herbert Dubno

[57] ABSTRACT

A clamping device for a sheet clamping machine comprises a pair of horizontal bars with tongues engaging on opposite sides of a sheet stack and drawn together to generate the clamping action by a piston-and-cylinder unit mounted on the back of the lower bar and having a piston connected to a cable which passes through the lower bar and then is guided vertically upwardly to the upper bar where that cable is attached. The cable thus applies a clamp closing force perpendicular to the bars.

20 Claims, 3 Drawing Sheets

5,484,256

CLAMPING DEVICE, ESPECIALLY FOR CLAMPING A STACK DURING STACK CHANGES IN A STACKING APPARATUS

FIELD OF THE INVENTION

My present invention relates to a stacking device for a sheet stack, especially a portion of a stack of paper, paperboard or cardboard sheets and, more particularly, for use in clamping a portion of sheet stack in a sheet-stacking machine during the changing of the stacks.

BACKGROUND OF THE INVENTION

In the preparation of packages of paper or cardboard sheet, it is common to provide sheet stacks which can be provided on pallets and, for a stack change, i.e. when a previously formed stack is completed, to engage a portion of the stack with a clamping device. In this manner, a stack of sheets is clamped on one side to prevent shifting of this stack or portion or the shifting of individual sheets thereof during the stack change process. Clamping devices of this type can include two parallel clamping beams which can engage a stack of sheets or a plurality of such stacks side by side across the machine width to thereby hold the sheets against relative movement.

In EP-B-0 316 568, an apparatus is described for stacking sheets having a clamping device of this type. This apparatus allows the removal of a full stack without interrupting the feed of the sheets to the stacking location, the continuity building of a new stack, and the deposit of the clamped portion of the stack onto the stacking platform once the previously-formed stack has been removed. The apparatus operates also without diverting the on-coming sheets from the stacking location. For this purpose, the apparatus makes use of an auxiliary stacking platform which can be inserted into the stacking region to hold the newly-formed stack while the previously-completed stack therebelow is transported away. To allow insertion of the auxiliary stacking platform between the finished stack and the paper sheets thereabove without damaging the sheets or shifting the sheets in the newly-forming stack, prior to the insertion of the auxiliary stacking platform, the portion of the stack above the completed stack is engaged between tongues of two clamping elements on one side of the stack. In this system, the stack formed above the insertion plane is gripped and held during the insertion operation.

The clamp drive in this case utilizes double-acting pneumatic piston-and-cylinder units disposed at opposite ends of the upper clamping beam, and which allows the upper clamping beam to move upwardly and downwardly relative to the lower clamping beam.

In stacking apparatus of the type described, the clamping beams can have very limited cross sectional areas because of the lack of available space. With very large machine widths, i.e. machine widths greater than 2000 mm, clamping beams which are supported only at their ends tend to bend between these ends. As a consequence, where a multiplicity of stacks are formed side by side and are clamped together, stacks in the middle cannot be reliably clamped and, in general, the clamping effect can be irregular and there can be damage to the sheets.

When an effort is made to solve this problem by increasing the clamping force, even greater bending can occur and, especially when the force at the sides is excessive, the clamping elements can be damaged and/or the sheets can be marked so that they become unusable or unmarketable.

OBJECTS OF THE INVENTION

It is, therefore, the principal object of the present invention, to provide an improved clamping device, especially for a sheet-stacking machine of the type described, whereby the aforedescribed drawbacks are avoided.

Another object of the invention is to provide a clamping device for a stack of sheets which can have a significant working width while nevertheless ensuring a uniform clamping effect over the entire length of the clamping beams or bars, especially where a multiplicity of stacks in side by side relation are to be clamped.

It is also an object of this invention to provide an improved sheet-stacking machine or apparatus in which the clamping effect is more reliable, especially for machines of significant widths, say 2000 mm or greater.

SUMMARY OF THE INVENTION

These objects and others which will become apparent hereinafter are attained, in accordance with the invention, with a clamping device, especially for the clamping of one or more stacks of sheets, particularly in the case of a stack change in a stacking apparatus or machine for paper, paperboard or cardboard sheets, which has two parallel clamping bars and is provided with a clamping drive for shifting these bars relatively in a direction perpendicular to their longitudinal dimensions. According to the invention, one or more traction drives are provided along the bars, the traction drives being connected to respective flexible elements, e.g. wire cables. Each wire cable has one end connected to one of the clamping bars and passes around a guide, referred to herein as a direction-change guide, especially a pulley, on the other clamping bar, the point at which the element is connected to the one clamping bar and the guide being aligned perpendicular to the longitudinal dimensions of the bars so that the element runs perpendicular to the bars between them. More particularly, the clamping device according to the invention can comprise:

a pair of parallel clamping bars;

respective arrays of tongues projecting from the clamping bars and adapted to engage a stack of sheets between the array; and drive means for relatively displacing the bars perpendicular to the bars to clamp the stack between the arrays, the drive means including:
at least one traction drive,
an elongated flexible element connected to the traction drive at one end of the element and to one of the bars at an opposite end of the element and at an attachment location on the one of the bars, and
a direction-changing guide on the other of the bars around which the element passes between the ends, the element passing between the location and the guide perpendicular to the bars.

The clamping bars, especially the upper clamping bar or the clamping bar to which the end of the cable is secured, can be limitedly elastic, thereby ensuring that any irregularities in the thicknesses of the stacks to be clamped or in the surfaces to be engaged by the upper bar are compensated when the clamp is tightened. This ensures a significant improvement in the clamping effect. According to the invention, the traction drive is a piston-and-cylinder unit which can be mounted on a back side of the lower or other bar, preferably parallel thereto while the guide and the location attachment of the cable are at the front sides of the bars, the cable passing from the back side to the front side through the lower bar.

The cable can have a compensating loop provided with a spring force and disposed between the guide and the piston-and-cylinder unit to ensure that the cable will always be maintained taut even when the bars are shifted separately horizontally to engage the stack portions or to disengage therefrom. The elastic bars ensure a uniform distribution of the clamping force over the length of the bars and can prevent undesired marking of the paper sheets.

An apparatus for stacking sheets can comprise:

a vertically shiftable stacking platform disposed below a feed plane for oncoming sheets arriving at a feed side of the platform for collecting the sheets in a stack on the platform;

a variable-height stack-clamping device at the feed side for clamping a portion of the stack, the device comprising:

a pair of horizontal parallel clamping bars disposed one above another, respective arrays of tongues projecting from the clamping bars and adapted to engage the portion of the stack between the array, and drive means for relatively displacing the bars perpendicular to the bars to clamp the portion of the stack between the arrays, the drive means including:

at least one traction drive, an elongated flexible element connected to the traction drive at one end of the element and to one of the bars at an opposite end of the element and at an attachment location on the one of the bars, and a direction-changing guide on the other of the bars around which the element passes between the ends, the element passing between the location and the guide perpendicular to the bars; and an auxiliary platform located below the device, insertable into the stack to separate the portion therefrom and retractable from the stack, the platform being provided with means for moving the platform vertically.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
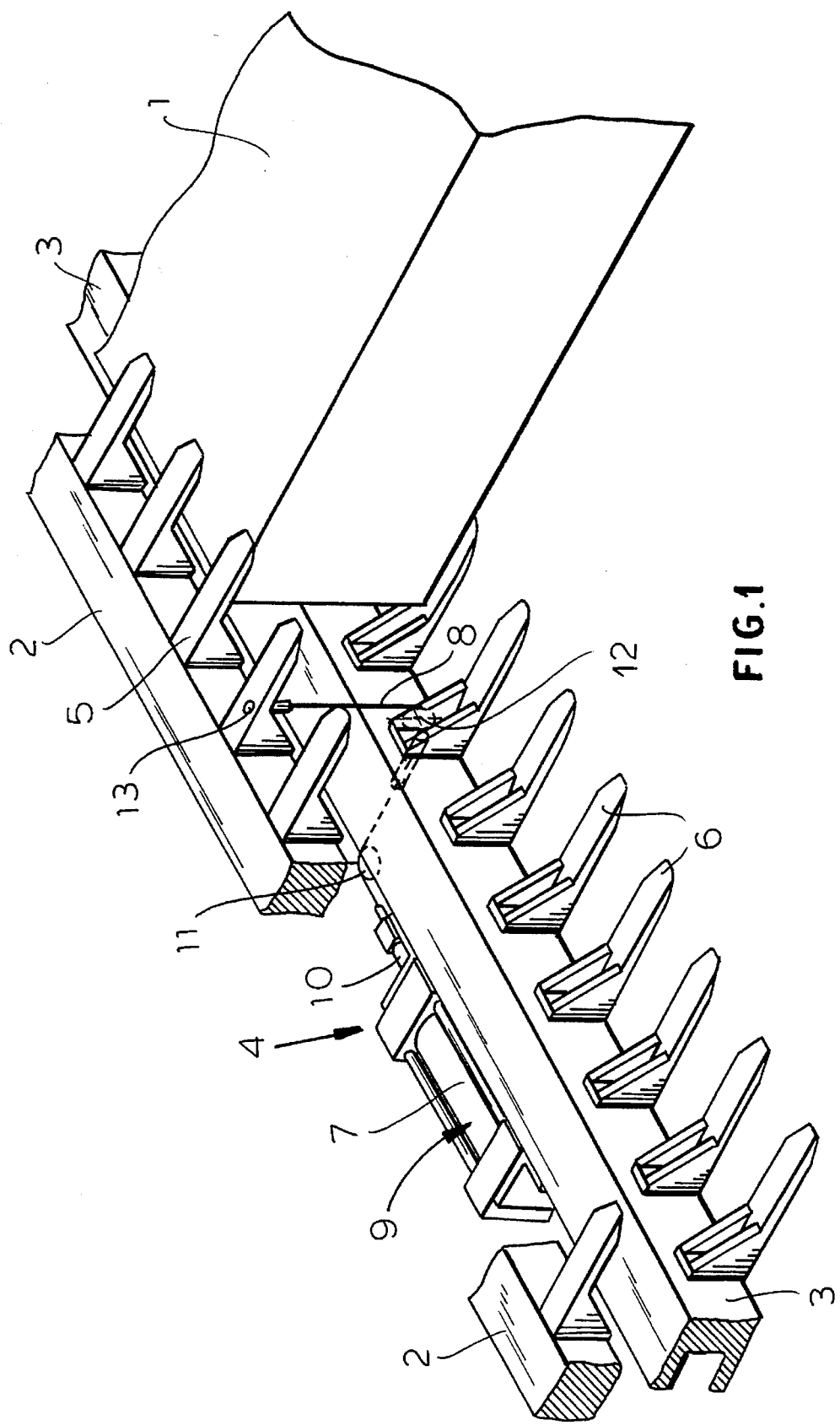
FIG. 1 is a perspective view, partly broken away and in highly diagrammatic form, showing a clamping device for the clamping of a sheet stack according to this invention.
Figure 2:
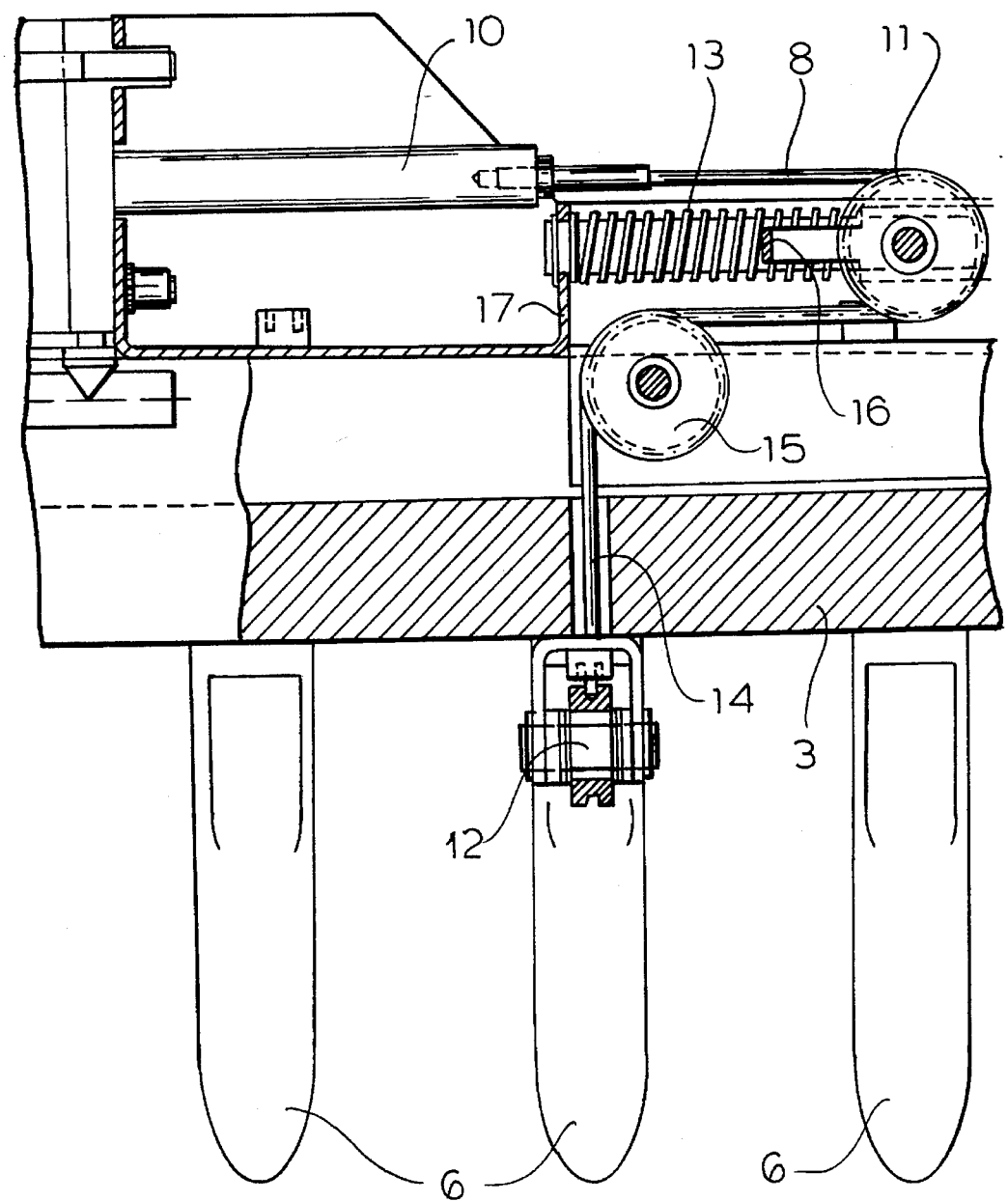
FIG. 2 is a partly broken away plan view illustrating a detail of an embodiment of the clamping device provided with a compensating loop for the cable.

The clamping device shown in FIGS. 1 and 2 serves for the clamping of a portion of a sheet stack in the stack-changing operation of a stacking apparatus for paper, paperboard or cardboard sheets. The construction of the stacking apparatus has been shown in FIG. 3.

The clamping device comprises two horizontal elongated clamping bars 2, 3, which are parallel to one another and cooperate with a clamping drive to engage a stack 1 between them, the clamping drive 4 moving the bars relatively in a direction perpendicular to their longitudinal dimensions, i.e. vertically. In the most common construction of a stacking apparatus, the clamping bars 2, 3 extend one above the other over the full machine width or working width and engage a plurality of stacks disposed side by side across the machine width, simultaneously. Only one of these stacks, namely the stack 1, is visible in FIG. 1 in part so that the parts of the clamping drive 4 will be visible.

Each of the clamping bars 2, 3 is comprised of a limitedly elastic solid cross section or hollow section member from a front side of which, turned toward the stack (sheet stack portion 1), a respective row of clamping tongues 5, 6 spaced apart along the respective bars extends. All of the clamping tongues 5, 6 are so shaped that they can be inserted into a stack from, for example, the left side thereof, as shown in FIG. 1 with a minimum of friction and with a minimum of interference by sheets of the stack and can grip the stack 1 between the clamping tongues 5, 6 without marking of the sheets. The clamping tongues 5 of the upper clamping bar 2 are parallel and mirror symmetrical to the clamping tongues 6 of the lower bar 3 and are disposed above the latter.

The drive 4 is comprised of one or more traction drives 7, each of which is connected with one end of a traction element 8 whose other end is affixed to one of the clamping bars, e.g. the clamping bar 2, and passes around a guide in a direction change on the other clamping bar, e.g. the clamping bar 3. Between the fastening point on the clamping bar 2 and the direction change point on the other clamping bar 3, the element 8 runs perpendicular to the longitudinal dimensions of the clamping bars 2, 3, i.e. vertically. Preferably a plurality of such traction drives 7 are spaced along the width of the machine and hence along the clamping bars 2, 3. At least one of the traction drives 7 is provided at a central location along the lengths of the clamping bars 2, 3 and thus at the center of the working width of the stacking apparatus.

FIGS. 1 and 2 show a preferred embodiment of the clamping drive wherein the traction drive is formed by a pneumatic piston-and-cylinder unit as is designated at 7 and the element 8 is a wire cable. So that the piston-and-cylinder unit 7 will occupy the smallest possible space, the piston 9 is parallel to the bar 3 and the unit 7 lies along the back side of the bar 3, i.e. the side opposite the front side which faces the stack 1.

The cable end affixed to the piston rod 10 extends parallel to the clamping bar 3 and then is guided about a deflection roller 11 through 90° to pass through a bore in the clamping bar 3 to the front side where the cable is deflected again through 90° about a guide roller 12 to extend vertically upwardly to the clamping bar 2. The free end of the cable 8 is affixed by a clamp 13 to the upper clamping bar 2.

The aforedescribed guidance of the wire cable 8 ensures that the bars 2, 3 can be moved toward one another without generating a component of movement in their longitudinal directions or in a direction toward the stack 1 or away therefrom. So that the clamping force will be as uniform as possible over the length of the stack engaged by the tongues 5, 6, the fastening location 13 for the free end of the cable and the guide 12 are provided as close as possible to the stack 1, e.g. on respective tongues 5 and 6.

The bars 2 and 3 are mounted for independent horizontal movement toward and away from the stack so that they can be inserted into the stacking region. The separation of the bars 2, 3 to disengage the clamping tongues 5, 6 from the stack is effected by means of two piston-and-cylinder units which are provided at the opposite ends of the bars 2, 3, between the latter for pressurization to spread the bars apart. These piston-and-cylinder units have not been shown.

To enable independent movement of the upper bar 2 in the direction of the stack 1 without a detrimental effect upon the cable 8, the cable 8 is guided at the back of the bar 3 in a compensating loop and is maintained permanently taut as has been detailed in FIG. 2. The cable-tightening device is formed with a deflecting roller 11 mounted for movement parallel to the connecting rod 10 against the force of coil spring 13. The roller 11 deflects the cable 8 through 180° from the piston rod 10 to a stationary guide roller 15. A stop 16 for the roller 11 can engage a bracket 17 on which the compensating loop device is mounted. The cable passes from the roller 15 through a bore 14 in the bar 3 to the front side thereof.

At the front side, the cable 8 is guided about the roller 12 into a vertical orientation, upwardly to the bar 2. The displacement of the roller 11 parallel to the piston rod 10 is so selected that for the relative movement of the bar 3 in a direction toward the stack 1, the loop supplies sufficient cable length that the piston rod 10 need not be drawn out of the cylinder 9 and, upon engagement of the stop 16 with the wall 17 of the bracket, the loop is at a minimum and operation of the piston-and-cylinder unit 9, 10 can provide sufficient displacement to generate the desired clamping force.

Figure 3:
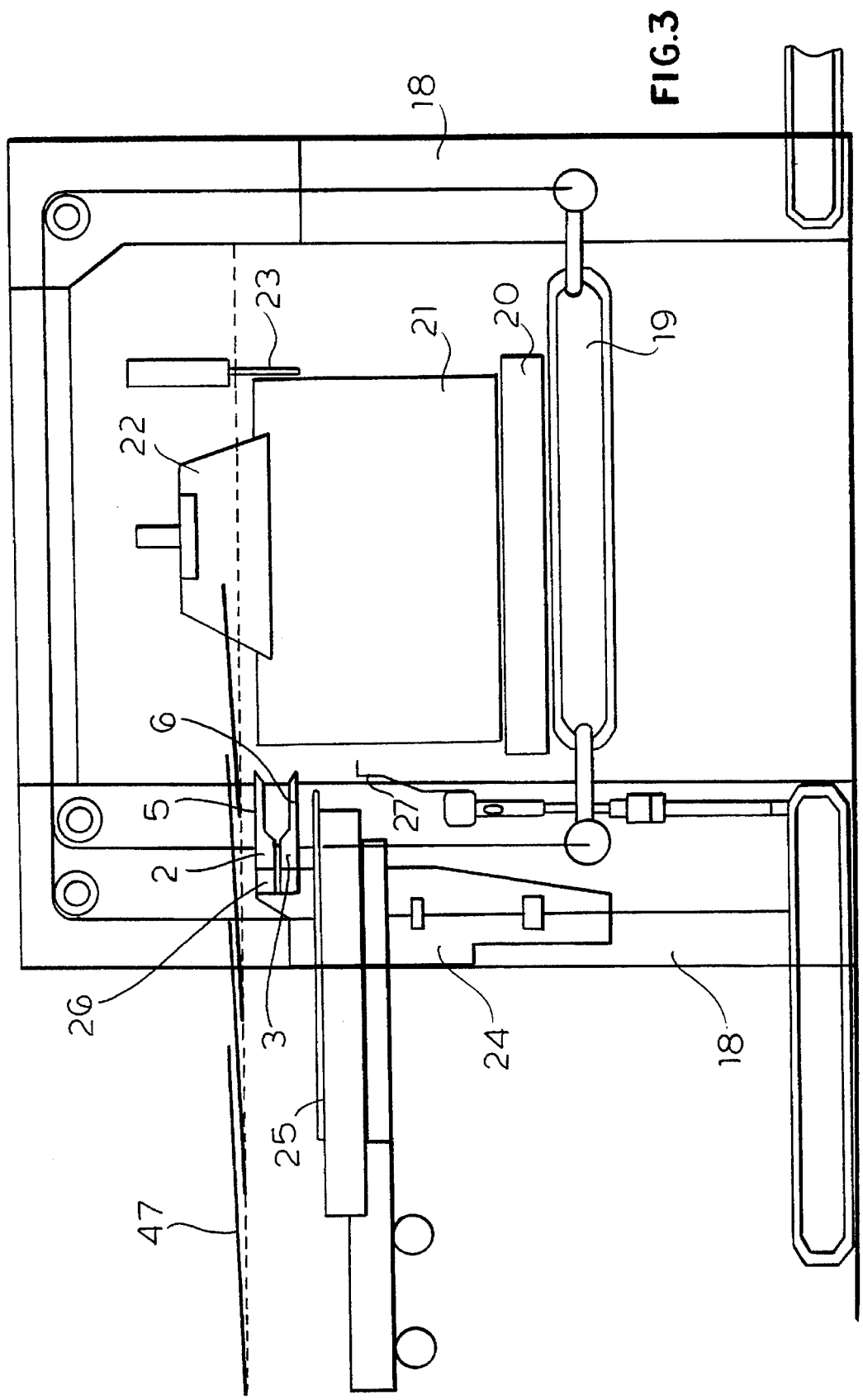
FIG. 3 is a side elevational view, also in highly diagrammatic form, illustrating a stacking apparatus according to the invention.

FIG. 3 shows the construction of the stacking apparatus in use for the stacking of continuously fed sheets 47 which are supplied in an overlapping pattern to the stacking location.

The stacking apparatus comprises a frame having horizontally spaced vertical stands 18 on which the stacking platform 19 is vertically movable. On the platform 19, pallets 20 can receive stacks 21 of the sheets fed at 47 to the stacking location. At the stack location, the stack 21 is provided by collecting the sheets between lateral guide plates 22 and a stop plate 23 against which the leading edges of the sheets impact. For a stack change without interruption of the sheet feed, a slide 24 is provided for vertical movement in the stand 18 at the inlet side for the sheets 47 and carries an auxiliary stacking platform 25 which is vertically movable and above which a clamping device 26 is provided. The clamping device 26 has the construction described in connection with FIGS. 1 and 2.

The clamping bars 2 and 3 are horizontally movable independently from one another on the slide 24 so that the clamping tongues 5 can be introduced between the sheet rear edges in the stack 21 independently from the clamping elements 6.

The rake-like array of separating fingers 27 is vertically movable upon the stand 18 at the inlet side of the apparatus, these fingers being located between the feed plane of the sheets 47 and the region below the platform 25. To form a gap between the rear edges of the sheet, the horizontally bent separating fingers of the unit 27 can be inserted between the rear sheet edges.

The stacking apparatus of FIG. 3 operates as follows. During the stacking, the upper side of the stack 21 is maintained at a constant height below the feed plane by a corresponding lowering of the stacking platform 19. When a predetermined number of sheets has been stacked upon the platform, the separating element 27 is introduced at the level of the feed plane between the rear edges of the topmost sheet of the completed stack 21 and the next oncoming sheet. The element 27 moves downwardly with the stack 21 until the level of the lower clamping tongues 6 is reached. The element 27 then is fixed against vertical movement while the stack 21 continues to lower until a gap is formed below the separating fingers. The clamping tongues 6 are inserted into the gap by horizontal movement of the bar 3. The slide 24 synchronously moves downwardly simultaneously with the stack 21.

The separating element 27 is removed from the stack 21 and is again shifted upwardly to form a gap for the upper clamping tongues 5 in a similar manner. When the element 27 reaches the level of the tongues 5, it is stopped until the upper gap is formed and the bar 2 and the tongues 5 are moved to the right (FIG. 3) to again position the tongues 5 above the tongue 6 and insert the tongues into the stack at the upper gap. By actuation of the clamping drive 4, the clamp formed at the bars 2, 3 is closed to engage the stack 1 between the tongues 5 and 6.

By a brief accelerated lowering of the stack 21, a gap is formed below the lower clamping tongue 6 into which the auxiliary stacking platform 25 is introduced by horizontal shifting. The clamping device 26 during insertion of the platform 25, prevents a shifting of the sheets for damage thereto.

The stack 1 is deposited upon the platform 25 while the finished stack 21 is lowered to the ground and transported away. After a new empty pallet 20 is placed upon the platform, the latter is raised below the auxiliary platform 25 which is then withdrawn, while the clamp 26 retains the stack 1, and sheets continue to accumulate thereabove, thereby transferring the resulting partial stack to the pallet 20. The clamp 26 is opened and the tongues 5, 6 are withdrawn to the left in FIG. 3 to the rest positions there shown. Until the next stack change, the sheets 47 continue to collect on the new pallet 20 and the stack of sheets is left there by the withdrawal of the clamp.

I claim:

1. A clamping device for a stack of sheets, comprising:
   a pair of parallel clamping bars each having a longitudinal dimension;
   respective arrays of tongues projecting from said clamping bars and adapted to engage a stack of sheets between said arrays; and
   drive means for relatively displacing said bars perpendicular to the longitudinal dimensions of said bars to clamp said stack between said arrays, said drive means including:
   at least one traction drive,
   an elongated flexible element connected to said traction drive at one end of said element and to one of said bars at an opposite end of said element and at an attachment location on said one of said bars, and
   a direction-changing guide on the other of said bars around which said element passes between said ends, said element passing between said location and said guide perpendicular to the longitudinal dimensions said bars.

2. The device defined in claim 1 wherein said element is a wire cable.

3. The device defined in claim 2 wherein said traction drive is a piston-and-cylinder unit.

4. The device defined in claim 3 wherein said unit is mounted on a back side of said other of said bars opposite a front side thereof from which the respective tongues project, said cable extending from said back side to said front side.

5. The device defined in claim 4 wherein said one of said bars has a front side from which the respective tongues project and said guide and said location are provided at said respective front sides.

6. The device defined in claim 5 wherein said unit is disposed parallel to the longitudinal dimension of said other bar.

7. The device defined in claim 6 wherein said one of said bars is limitedly elastic.

8. The device defined in claim 7, further comprising means forming a compensating loop for said cable shortenable against a spring force between said guide and said piston-and-cylinder unit for maintaining said cable taut.

9. The device defined in claim 1 wherein said traction drive is a piston-and-cylinder unit.

10. The device defined in claim 9 wherein said unit is mounted on a back side of said other of said bars opposite a front side thereof from which the respective tongues project, said cable extending from said back side to said front side.

11. The device defined in claim 1 wherein said guide and said location are provided at front sides of said bars from which said tongues project.

12. The device defined in claim 1 wherein said traction drive is a piston-and-cylinder unit disposed parallel to the longitudinal dimension of said other bar.

13. The device defined in claim 1 wherein said one of said bars is limitedly elastic.

14. The device defined in claim 1, further comprising means forming a compensating loop for said element shortenable against a spring force between said guide and said traction drive for maintaining said element taut.

15. An apparatus for stacking sheets, comprising:
- a vertically shiftable stacking platform disposed below a feed plane for oncoming sheets arriving at a feed side of the platform for collecting said sheets in a stack on said platform;
- a variable-height stack-clamping device at said feed side for clamping a portion of said stack, said device comprising:
    - a pair of horizontal parallel clamping bars disposed one above another, each bar having a longitudinal dimension,
    - respective arrays of tongues projecting from said clamping bars and adapted to engage said portion of said stack between said arrays, and
    - drive means for relatively displacing said bars perpendicular to the longitudinal dimensions of said bars to clamp said portion of said stack between said arrays, said drive means including:
        - at least one traction drive,
        - an elongated flexible element connected to said traction drive at one end of said element and to one of said bars at an opposite end of said element and at an attachment location on said one of said bars, and
        - a direction-changing guide on the other of said bars around which said element passes between said ends, said element passing between said location and said guide perpendicular to the longitudinal dimensions of said bars; and
- an auxiliary platform located below said device, insertable into said stack to separate said portion therefrom and retractable from said stack, said platform being provided with means for moving said platform vertically.

16. The apparatus defined in claim 15, further comprising a vertically movable finger insertable in said stack for forming a gap therein, said other bar being a lower one of said bars and being shiftable so that the tongues thereof enter said gap.

17. The apparatus defined in claim 16 wherein said element is a wire cable.

18. The apparatus defined in claim 17 wherein said traction drive is a piston-and-cylinder unit.

19. The apparatus defined in claim 18 wherein said unit is mounted on a back side of said other of said bars opposite a front side thereof from which the respective tongues project, said cable extending from said back side to said front side.

20. The apparatus defined in claim 19 wherein said one of said bars has a front side from which the respective tongues project and said guide and said location are provided at said respective front sides, said unit being disposed parallel to the longitudinal dimension of said other bar, said device further comprising means forming a compensating loop for said cable shortenable against a spring force between said guide and said piston-and-cylinder unit for maintaining said cable taut.

* * * * *